RETAINING DEVICE

Filed Oct. 7, 1957

Neil D. Bingham
INVENTOR.
BY Albert Rosen
Morris Spector
ATTORNEYS

United States Patent Office 2,909,354

Patented Oct. 20, 1959

2,909,354

RETAINING DEVICE

Neil D. Bingham, Los Angeles, Calif., assignor, by mesne assignments, to Thompson Ramo Wooldridge Inc., Cleveland, Ohio, a corporation of Ohio Application October 7, 1957, Serial No. 688,703

1 Claim. (Cl. 248—316)

This invention relates to retaining devices for electronic components such as transistors and the like. In further particular the invention concerns retaining devices of the type adapted to firmly engage any one of a number of different sized components (over a given size range) for a snug and vibrationless support thereof and at the same time to support the component in the cramped and shockprone environment common to portable equipment without appreciably interfering with the flow of cooling air to the component. While not limited thereto, the invention is herein described as embodied in a self-adjusting retaining device that is adapted to secure a power transistor in a shock and vibration environment, and which is itself adapted to be easily, quickly, economically, and permanently fixed to a mounting board in the equipment in which it is to be used.

An object of the invention is to provide an improved simply and economically fabricated electronic component support device that does not occupy appreciably more space than the component it is to support, and one which is adapted to positively fix the component in a predetermined position at installation.

The foregoing and related advantages are realized in a mounting device that includes a base having a single aperture for receiving a rivet therethrough for securing the device to a mounting board to which the device is to be fixed. The base also includes an integral pronged portion adapted to engage the mounting board to anchor the device from rotational movement about the rivet. The device also includes, extending from the side of the base opposite the pronged portion, a pair of spaced-apart, springy, sheet metal arms, integral with the base, and each having a dihedral angled portion adapted to provide four facing component supporting surfaces for firmly engaging the component. The arrangement of surfaces referred to enables the device to accommodate any one of a number of regular or irregularly shaped components for firmly supporting them. According to another feature of the invention the device includes a flange integral with the base and extending therefrom to one side of the space encompassed by the arm surfaces to provide a means for accurately determining the longitudinal position of the component within the embrace of the arms referred to.

Referring now to the drawings.

Figure 1:
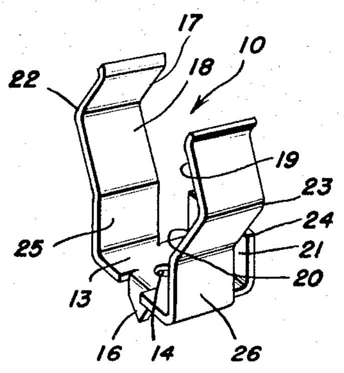
Fig. 1 is a perspective view of a retaining device embodying the invention.
Figure 2:
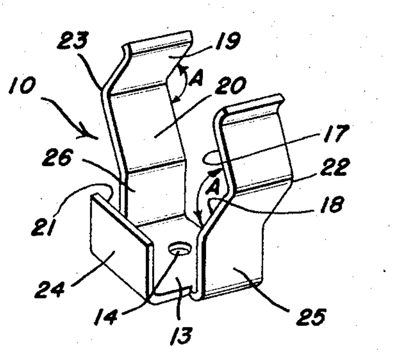
Fig. 2 is a perspective view of the device of Fig. 1 as seen from the end of the device opposite the end shown in Fig. 1.
Figure 3:
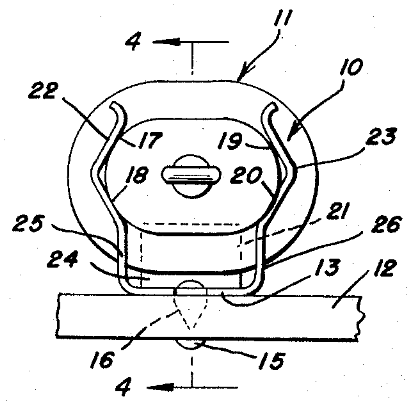
Fig. 3 is an elevation view of the device of Fig. 1 fixed to a mounting board and securing a power transistor thereto.
Figure 4:
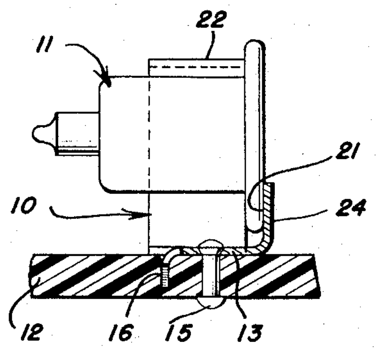
Fig. 4 is a sectional view taken substantially on line 4—4 of Fig. 3.

Referring now to Figs. 1 to 4 there is shown an improved retaining device or clip 10 according to the invention. The particular clip 10 illustrated is adapted to engage an electronic component or work-piece such as a power transistor 11 for supporting it a short distance away from a mounting board 12 to which the clip 10 is fixed. This spaced-apart support arrangement provides increased conductive and radiant dissipation of heat from the transistor to the ambient.

The clip 10 is made up of a substantially flat base portion 13, the base portion being adapted to lie flat in a snug fit against the flat surface of the mounting board 12. The base portion 13 has a single aperture 14 adapted to receive a fastening member such as a rivet 15 for securing the clip 10 to the board 12. The base portion 13 has, extending substantially normally from the plane of flatness of the base portion, an integral pronged portion 16. The pronged portion 16 is adapted to penetrate the mounting board 12 during a normal installation of the clip 10 for preserving the base portion from rotational movement about the rivet 15 and for insuring a firm engagement of the clip by the board in a shock and vibration prone environment.

The clip 10 of the invention includes a novel arrangement of five work-piece engaging surfaces 17 to 21 to assure (*a*) firm engagement of the work-piece (the transistor 11) by the clip in the environment aforementioned, (*b*) easy accommodation of the clip to work-pieces which have an actual size different from their nominal size and to work-pieces having different nominal sizes (over a given size range) and differently shaped contours, and (*c*) maximum ventilation of the work-piece for increased heat dissipation by supporting the work-piece in spaced relation with respect to the mounting board 12. Four of the work-piece engaging surfaces are provided by the inside surfaces of a pair of arms 22 and 23, and the fifth work-piece engaging surface is provided by the inside surface of a flange 24. The arms 22 and 23 and the flange 24 are each integral with the base portion 13 of the clip and each extends from the base portion in a direction opposite the direction of extension of the pronged portion 16.

The arms 22 and 23 are made up of substantially flat, generally parallel, spaced-apart resilient sheet metal extensions of the base portion 13. The arms 22 and 23 each have a pair of flat wall portions defining, respectively, the work-piece engaging surfaces 17 and 18, and 19 and 20. The arms 22 and 23 also each have an intermediate arm portion 25 and 26, respectively, spacing the work-piece engaging surfaces 17 to 20 from the base portion 13. Adjacent wall portion surfaces 17 and 18, and 19 and 20 form dihedral angles A (Fig. 2) between them. The dihedral angles A of each arm, which are substantially right dihedral angles in the example illustrated, are positioned to face each other so as to provide a set of four surfaces adapted to make at least a four point contact with the work-piece to be supported, whether the work-piece has a regular or irregular outside contour. Since the work-piece engaging surfaces 17 to 20 are resilient, and are spaced from the mounting board 12, they are adapted to firmly secure different size work-pieces against vibration and shock and yet allow for maximum ventilation of the work-pieces.

The substantially flat flange 24 provides the fifth work-piece engaging surface 21 referred to. The flange 24 extends from the base portion 13 to one side of the space encompassed by the arm surfaces 17 to 20. The plane of flatness of the flange 24 is substantially normal to the planes of flatness of all of the other major surfaces of the clip. The flange 24 extends only a short distance into the space encompassed by the arm surfaces 17 to 20. This short extension of the flange 24 provides a stop surface 21 for accurately locating the longitudinal position of the transistor 11 in the space referred to. Since the flange 24 extends but a short distance into this space, the function of the flange as a stop is independent of the contour of the end of the transistor 11 to be located.

Figure 5:
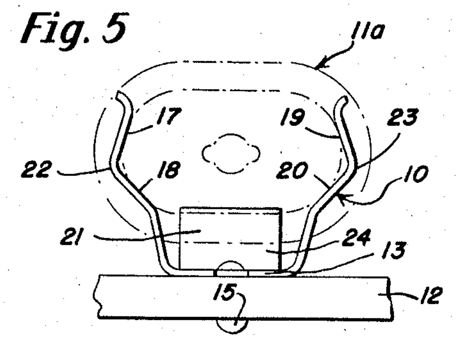
Fig. 5 is a view similar to the one of Fig. 3 and illustrating the resilience of the device of the invention in connection with the mounting of a transistor having a larger size than the one shown in Fig. 3.

Fig. 5 shows the retaining device or clip 10 used in supporting a transistor 11*a* of a size larger than the size that the clip would be ordinarily designed for. The resilient character of the arms 22 and 23 allows them to accommodate this larger transistor 11*a* as well as the smaller one for which it was designed. The clip of the invention thus also secures the larger transistor 11*a* against vibrations and shock and provides for a high degree of ventilation.

From the foregoing it is appreciated that the retaining device described is especially suitable for close quarters installation by virtue of its compactness (the device takes but little more space than the space occupied by the work-piece to be supported) and by virtue of the heat dissipation that it allows in spite of its compactness.

What is claimed is:

The combination comprising: an electronic component having a body portion and a flanged table-top base, said body portion being integral with and extending from said base; a mounting device for said electronic component, said device including a base element adapted to snugly engage a mounting board to which said component is to be secured and having at least one aperture for receiving a fastening member for securing said device to the board, a pronged portion extending in one direction from said base element and adapted to penetrate the mounting board in such a manner as to preserve said base element from rotational movement with respect to the board, a pair of resilient spaced-apart arms extending from said base element in a direction generally opposite said one direction, each of said arms having a pair of substantially flat adjoining walls forming a substantially dihedral angle therebetween, the dihedral angle of each arm facing the dihedral angle of the other arm, thereby to provide a set of four engaging surfaces adapted to receive said body portion of said component for a secure engagement thereof between said four surfaces, and a flat and rigid flange element extending perpendicularly from said base element in the direction of said arms and spaced therefrom by an amount equal to the thickness of said flanged base of said component in order to provide a snug and vibrationless fit of said component base between said arms and flange element, said flange element contacting said component base throughout its engaging surface to provide increased conductive and radiant dissipation of heat to quickly bring the temperature of said component to the ambient temperature.

References Cited in the file of this patent

UNITED STATES PATENTS

| | | |
|---|---|---|
| 1,174,138 | Gauvreau | Mar. 7, 1916 |
| 2,541,828 | Peck | Feb. 13, 1951 |

FOREIGN PATENTS

| | | |
|---|---|---|
| 257,320 | Great Britain | Aug. 23, 1926 |